July 11, 1961
W. H. KOLBE ET AL
2,991,778
FUEL-AIR INDUCTION SYSTEM FOR V-TYPE ENGINES
Filed May 23, 1960
3 Sheets-Sheet 1
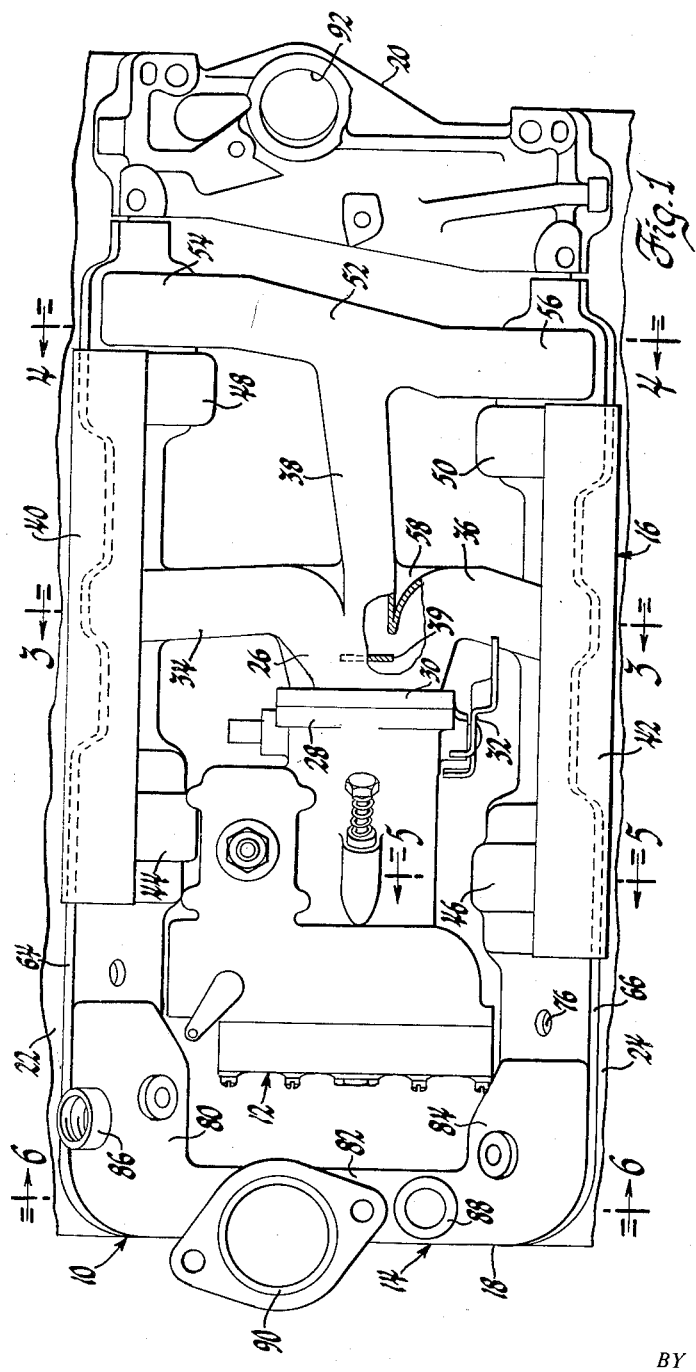
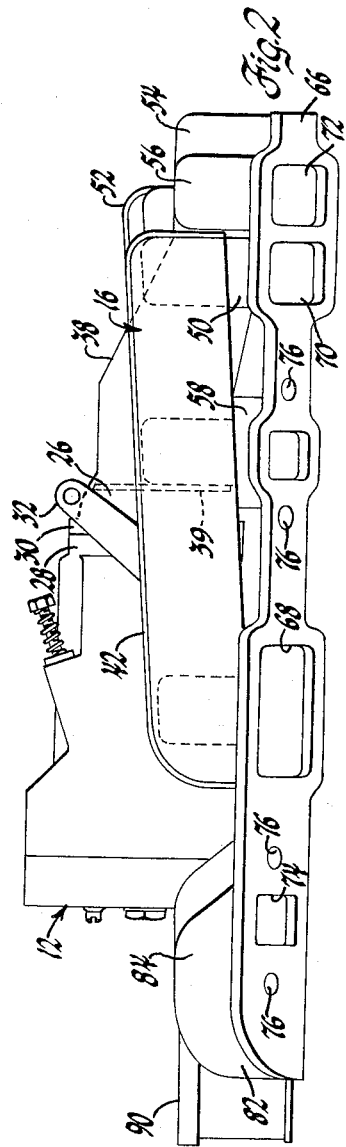
INVENTORS
William H. Kolbe
BY & Edward Zwolak
ATTORNEY July 11, 1961 W. H. KOLBE ET AL 2,991,778
FUEL-AIR INDUCTION SYSTEM FOR V-TYPE ENGINES
Filed May 23, 1960 3 Sheets-Sheet 2
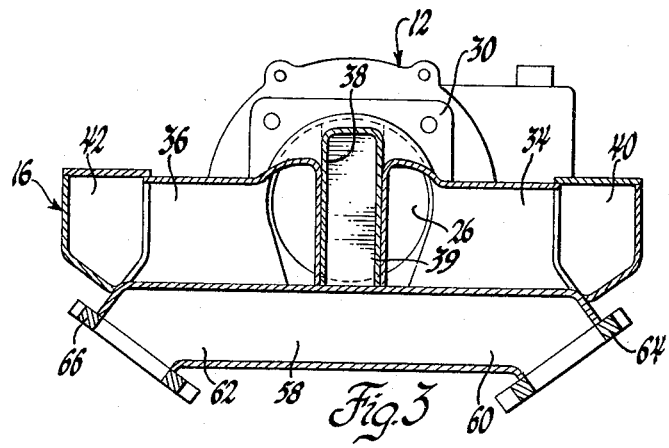
Fig. 3
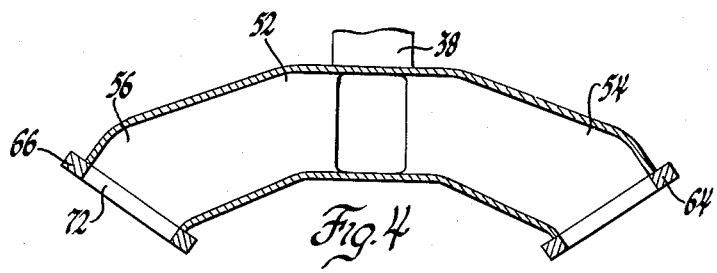
Fig. 4
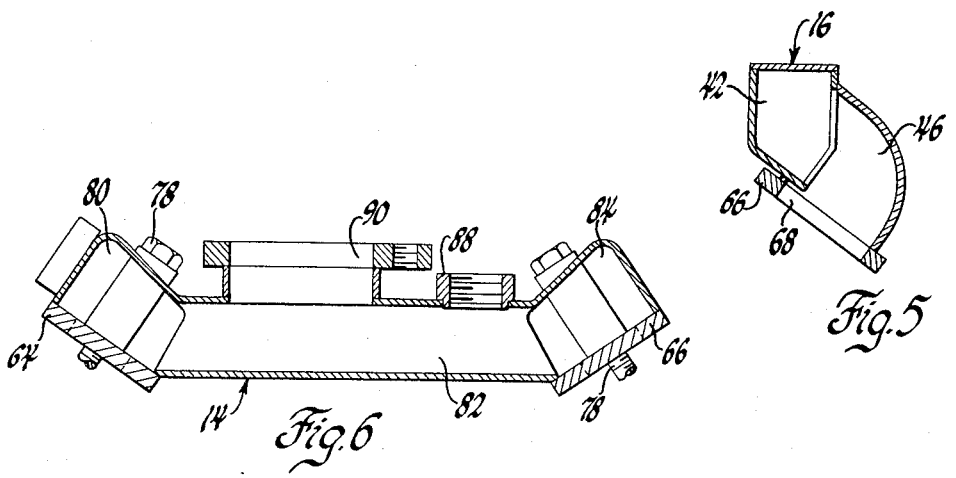
Fig. 5
Fig. 6
INVENTORS
William H. Kolbe
BY & Edward Zwolak
D. D. McGraw
ATTORNEY July 11, 1961 W. H. KOLBE ET AL 2,991,778
FUEL-AIR INDUCTION SYSTEM FOR V-TYPE ENGINES
Filed May 23, 1960 3 Sheets-Sheet 3

INVENTORS
William H. Kolbe
BY & Edward Zwolak
ATTORNEY

United States Patent Office

2,991,778
Patented July 11, 1961

2,991,778
FUEL-AIR INDUCTION SYSTEM FOR V-TYPE ENGINES
William H. Kolbe, Birmingham, and Edward Zwolak, Detroit, Mich., assignors to General Motors Corporation, Detroit, Mich., a corporation of Delaware
Filed May 23, 1960, Ser. No. 31,157
22 Claims. (Cl. 123—122)

The invention relates to an induction system for introducing fuel-air charges into V-type internal combustion engines. The system is designed to mount a side-draft carburetor between the banks of cylinders of such an engine so that the carburetor and manifold extend for a minimum height above the engine block. The manifold and carburetor arrangement illustrated embodies the invention in a construction for use with a V–8 engine although it may be modified for use with other V-engines.

The system includes a side-draft carburetor which provides a fuel-air mixture to the intake manifold. The manifold has all of the passages leading to the various engine cylinders located in a common plane so that none of the passages are submarined. It also includes a water outlet section having connections for delivering water to a vehicle passenger space heater and to a radiator to provide cooling for the engine. One modification of the manifold construction is illustrated as being primarily formed of sheet metal and plate stock although it may be modified for other manufacturing methods. Another modification is illustrated as being cast.

The manifold portion of the system extends between the banks of cylinders of the engine on which it is installed so that it acts as a strengthening member for the engine frame. A separate frame portion may also be provided adjacent the rear end of the manifold passages and includes a mounting for the engine distributor. The various passages connecting with the engine cylinders for a V–8 engine provide minimum firing intervals of 180° in the same manifold leg or distribution passage.

In an effort to increase driver visibility and to accommodate automotive stylists much effort has been expended in lowering the overall engine height for motor vehicles so that the engine hood can be lowered. One of the major factors contributing to overall engine height is the positioning of a conventional down draft carburetor above the intake manifold. An air cleaner and intake silencer assembly is normally positioned on the air entry side of the carburetor and in this position further adds to the overall engine height. Up draft and side draft carburetors have frequently been used with engines having a single cylinder bank in order to materially reduce the overall engine height. When side draft carburetors have been utilized with V-type engines the carburuetor has been positioned so as to extend from one side of the manifold and over one of the engine banks or at the top of an arch formed by manifold headers and passageways. The manifold inlet passages leading to the various cylinders then extend downwardly with some of them passing underneath the carburetor in order to furnish a fuel-air charge to the cylinders. It has also been the practice to submarine some of the passages in relation to other passages.

In a system embodying the invention, the carburetor is mounted in a nested position intermediate the banks of engine cylinders within the V, and the manifold passages leading to each cylinder are connected with manifold distribution passages which receive the fuel-air charge from a manifold plenum chamber to which the side draft carburetor is connected.

In the drawings:

FIGURE 1 is a plan view, with parts broken away and in section, of an induction system embodying the invention, the system being adapted for use with a V–8 type engine.

FIGURE 2 is a side view of the induction system of FIGURE 1 and is taken prior to the installation of the system on an engine.

FIGURE 3 is a cross section view of the system of FIGURE 1 taken in the direction of arrows 3—3 of that figure.

FIGURE 4 is another cross section view of the system of FIGURE 1 taken in the direction of arrows 4—4 of that figure.

FIGURE 5 is a section view of a portion of the manifold illustrated in FIGURE 1 and taken in the direction of arrows 5—5 of that figure.

FIGURE 6 is a cross-section view of another portion of the manifold illustrated in FIGURE 1 and taken in the direction of arrows 6—6 of that figure.

Figure 7:
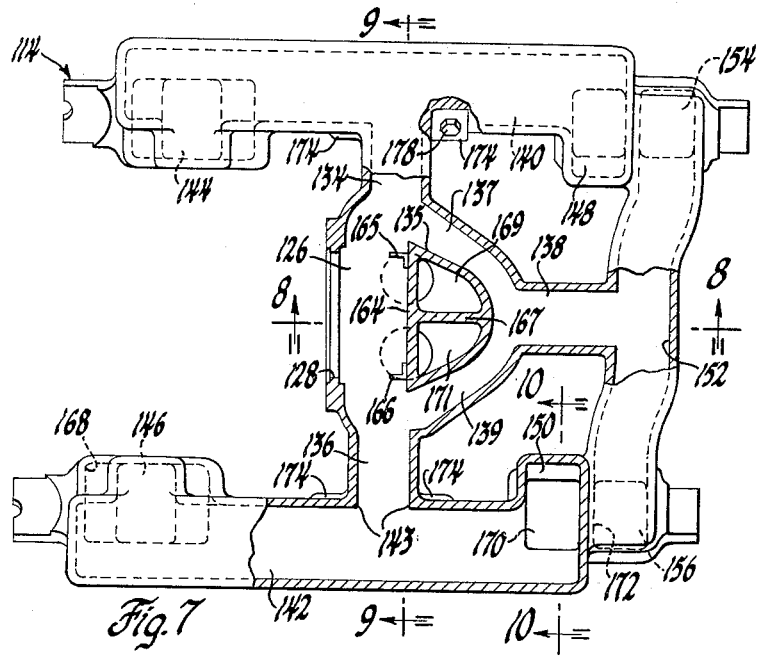
FIGURE 7 is a plan view of a modification of the induction system of FIGURE 1 with parts broken away and in section.

The induction system 10 illustrated in plan view in FIGURE 1 and in sectional detail in FIGURES 2 through 6 includes a side-draft carburetor 12 and an intake manifold 14. The intake manifold structure includes an induction passage section 16, a water outlet section 18 and a distributor mounting section 20. The manifold 14 extends between the banks 22 and 24 of a V–8 type engine when the system is installed thereon so that the induction passages in section 16 are aligned with the intake passages in the engine block which lead to the various cylinders. The water outlet passages in the engine block are aligned with water passages in section 18 so that hot water may be conducted from the engine block to a suitable vehicle heater and to a radiator of conventional construction. Since it is common practice to drive the engine distributor from a camshaft located in a camshaft gallery positioned between the engine banks 22 and 24, underneath the manifold, the distributor mounting section 20 is also provided. It may be formed as an integral part of the manifold section 16 or may be a separate element.

The manifold section 16 includes an intake plenum chamber 26 which is positioned centrally of the manifold in longitudinal and transverse directions. The carburetor 12 has its outlet attached to the inlet end of plenum chamber 26 by any suitable means such as flanges 28 and 30, and suitable bolts. The throttle valve control link 32 is rotatably mounted on one side of the carburetor and a suitable throttle linkage is connected thereto for movement of the throttle control valve by an accelerator pedal or other suitable means. Manifold distribution passages or legs 34 and 36 extend transversely of the manifold and provide intake passageways which are connected with plenum chamber 26 so that the fuel-air mixture passing out of the carburetor and into chamber 26 may have portions conducted to some of the cylinders in each of the engine banks. A third manifold distribution passage or leg 38 extends longitudinally of the manifold and is centrally positioned between the sides of the manifold. Leg 38 provides another intake passageway which is also connected with plenum chamber 26 so as to receive portions of the fuel-air charge from that chamber, and is in a common plane with legs 34 and 36. Baffle 39 is provided in plenum chamber 26 in front of and spaced from the inlet end of passage 38. It is preferably about the same width as the inlet port and extends from the top wall to the bottom wall of the plenum chamber. It is so spaced from the plenum chamber side walls as to provide a pro rata distribution of fuel-air mixture to each of the distribution passages 34, 36 and 38.

A distribution chamber 40 is formed and positioned on one side of the manifold so that it extends longitudinally of the manifold. It preferably extends from the most forward cylinder in engine bank 22 rearwardly to the second and third of the four cylinders in that bank. Distribution passage 34 is connected to chamber 40 substantially at the mid portion of that chamber and conducts fuel-air charges from plenum chamber 26 to distribution chamber 40. A second distribution chamber 42 is provided on the other side of the manifold from chamber 40 and is constructed and positioned in a manner similar to chamber 40. Distribution passage 36 connects with chamber 42 at substantially the mid portion of that chamber and conducts fuel-air charges to the chamber from plenum chamber 26. Chamber 42 preferably extends from the intake passage of the most forward cylinder in engine bank 24 rearwardly to the intake passages of the second and third cylinders in that bank.

For convenience and in accordance with the usual manner of identification, the cylinders in engine bank 24 will be referred to as cylinders 1, 3, 5 and 7 in front-to-rear order and the cylinders in engine bank 22 will be referred to as cylinders 2, 4, 6 and 8 in front-to-rear order. Distribution chamber 40 therefore provides fuel-air charges for cylinders 2, 4 and 6 and distribution chamber 42 provides fuel-air charges for cylinders 1, 3 and 5. In this construction chambers 40 and 42 are positioned above and slightly outward of the respective intake ports which they serve. Short supply passages extend from distribution chambers 40 and 42 and communicate with the intake ports formed in the engine block for the respective cylinders served. The intake ports for cylinders 1 and 3 and cylinders 2 and 4 are siamesed so that single openings in those portions of the manifold mating with the engine block are provided adjacent these sets of ports to deliver fuel-air charges to both ports in each set. Short passage 44 extends from the forward end of distribution chamber 40 inwardly and downwardly to conduct fuel-air charges to the intake ports for cylinders 2 and 4. Short passage 46 extends from the forward end of distribution chamber 42 inwardly and downwardly to deliver fuel-air charges to the intake ports of engine cylinders 1 and 3. Short passage 48 extends inwardly and downwardly from the rear end of distribution chamber 40 so as to communicate with the inlet port for engine cylinder 6. Short passage 50 extends inwardly and downwardly from the rear end of distribution chamber 42 to communicate with the inlet port for engine cylinder 5.

A transverse distribution chamber or passage 52 extends across the manifold at the rear end thereof so as to have its end 54 communicate with the intake port for engine cylinder 8 and its other end 56 communicate with the intake port for engine cylinder 7. Distribution passageway 38 is connected with transverse distribution passage 52 in a generally central section of that passage so as to provide fuel-air charges for cylinders 7 and 8 from plenum chamber 26.

An exhaust crossover passage 58 is provided underneath substantially the entire length of distribution passages 34 and 36 and the forward end of distribution passage 38 as well as at least a portion of plenum chamber 26 to heat the fuel-air charges being introduced into the engine cylinders. End 60 of exhaust crossover passage 58 is positioned to communicate with the exhaust outlet port of one of the cylinders in engine bank 22 and end 62 of passage 58 is positioned to communicate with the exhaust outlet port of one of the cylinders of engine bank 24.

The portions of the manifold 14 which engage the engine blocks 22 and 24 through head gaskets may be formed of sheet stock to provide manifold plates 64 and 66. Plates 64 and 66 are illustrated as being made from separate stock. Instead, they may be made from a single plate having a U-shape so as to further strengthen the manifold and also to provide a valve camshaft gallery cover. Otherwise a separate gallery cover must be provided underneath the manifold. FIGURE 2 shows a view of the surface of the plate 66 which faces the engine bank 24. Opening 68 of plate 66 is aligned with the short manifold passage 46 and extends longitudinally of the manifold a sufficient distance to mate with the inlet ports of cylinders 1 and 3. Opening 70 has short passage 50 connected thereto and is positioned to be aligned with the inlet port of engine cylinder 5. Opening 72 is aligned with the end 56 of transverse distribution passage 52 so as to be in alignment with the intake port for engine cylinder 7. Opening 74 is provided in the forward end of plate 66 and connects with the water outlet port in engine bank 24 which delivers hot water from that bank to the water outlet section 18 of the manifold. Suitable apertures 76 are also provided in plate 66 so that the manifold mounting means such as bolts 78 may be inserted to secure the manifold to the engine block. Plate 64 is similarly constructed to serve the cylinders of engine bank 22.

The water outlet section 18 of the manifold includes a water passage 80 leading from the water outlet opening in engine bank 22 forwardly to a water transverse manifold passage 82 on the forward end of the manifold. Water passage 84 conducts water from engine bank 24 to passage 82. Suitable fittings 86 and 88 may be provided in any of the passages 80, 82 and 84 for connection with heater conduits so that hot water may be circulated to a passenger space heater in a motor vehicle. A water outlet 90 connects with passage 82 and may in turn be connected with the radiator of a vehicle to cool the engine water or other coolant.

The distributor mounting section of the manifold may be integrally formed with the remainder of the manifold if desired, but is illustrated as being a separate section. The engine distributor is mounted in opening 92 for easy access. Suitable mounting means may be provided for mounting section 20 between the rear ends of the engine banks 22 and 24.

The firing order for the cylinders of a V–8 engine with which the induction system may be utilized may be 1—8—4—3—6—5—7—2. When this firing order is used, the distribution passage 42 and short passage 46 provide the charge being fired in cylinder 1. The next fuel-air charge to be ignited is transmitted to cylinder 8 through the center distribution passage or leg 38. The distribution chamber 40 and short passage 44 provide the next fired charge to cylinder 4. The following charge is received by cylinder 3 from the distribution chamber 42 and short passage 46. The charge furnished the next firing cylinder passes into cylinder No. 6 from distribution chamber 40 and short passage 48. The charge next fired, in cylinder No. 5, is provided through distribution chamber 42 and short passage 50. Cylinder No. 7 is next fired and has received its fuel-air charge through center distribution passage 38 and the end 56 of transverse passage 52. The last fired cylinder in the cycle is the No. 2 cylinder and the fuel-air charge furnished to that cylinder is received from distribution chamber 40 through short passage 44. In this firing order the cylinder receiving fuel-air charges from the same distribution passage and firing 180° of crank angle apart are cylinders 3 and 5, and 4 and 6. All other cylinders fed by a common distribution chamber fire at least 270° apart, with cylinder 7 firing 450° after, or 270° before cylinder 8. This firing order in combination with the manifold structure provides the same firing order for cylinders connected with distribution chamber 40 as those connected with distribution chamber 42. This contributes to a balanced engine firing order in which mixture distribution is equalized to the various chambers. This results in better fuel-air induction and permits smoother engine operation.

Figure 8:
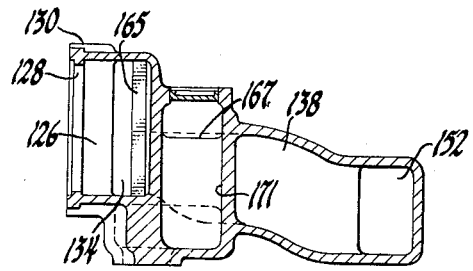
FIGURE 8 is a section view of a portion of the induction system shown in FIGURE 7 and taken in the direction of arrows 8—8 of that figure.
Figure 10:
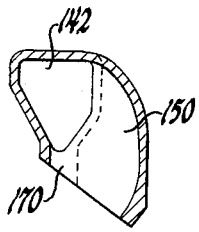
FIGURE 10 is a section view of a portion of the induction system shown in FIGURE 7 with parts broken away and is taken in the direction of arrows 10—10 of that figure.
Figure 9:
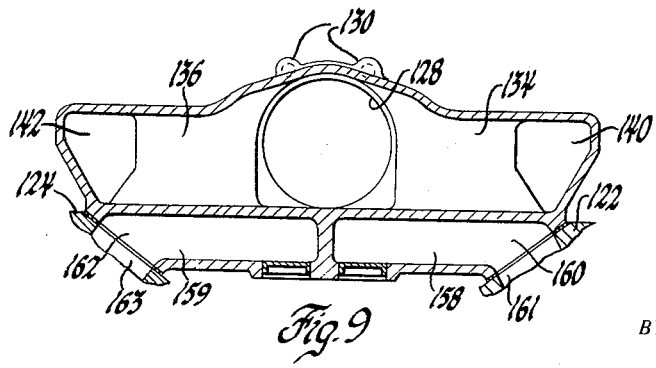
FIGURE 9 is a section view of a portion of the induction system shown in FIGURE 7 and is taken in the direction of arrows 9—9 of that figure.

A modification of the intake manifold portion of the induction system 10 is illustrated in FIGURES 7–10. The modification is shown as being adapted for casting, although it may be made by other manufacturing methods. The intake manifold 114 is adapted to be installed so that it extends between the banks 122 and 124 of a V–8 type engine in the same manner as does manifold 14 of FIGURE 1. Manifold 114 includes an intake plenum chamber 126 which is disposed centrally of the manifold in longitudinal and transverse directions. A side draft carburetor may be attached to mate with the inlet 128 of plenum chamber 126. Bolt flanges 130 may be utilized to mount the carburetor in this position. The manifold is provided with distribution passages or legs 134 and 136 which extend transversely of the manifold and provide intake passages which are connected with plenum chamber 126 so that portions of the fuel-air mixture from the carburetor received in chamber 126 may be conducted to some of the cylinders in each of the engine banks. A third manifold distribution passage or leg 138 extends longitudinally of the manifold and is centrally positioned between the sides of the manifold. Leg 138 is connected with plenum chamber 126 by feed passages 137 and 139, which are separated by a baffle and exhaust interchange section 135.

A longitudinally extending distribution passage 140 is formed and positioned on one side of the manifold and preferably extends from the most forward cylinder in the engine bank 122 rearwardly to the second and third of the four cylinders in that bank. Distribution passage 134 is connected to chamber 140 substantially at the mid portion of that chamber to conduct fuel-air charges from plenum chamber 126 to the distribution chamber.

A second distribution chamber 142 is provided on the other side of the manifold from chamber 140 and is constructed and positioned in a manner similar to that chamber. Distribution passage 136 connects with chamber 142 to provide fuel-air charges from plenum chamber 126. Chamber 142 preferably extends from the intake passage of the most forward cylinder in engine bank 124 rearwardly to the intake passages of the second and third cylinder in that bank. It is preferable to have the corners 143, forming the intersections of passages 134 and 136 with distribution chambers 140 and 142, formed squarely or with minimum radii in order to minimize the tendency of fuel droplets to adhere to the passage and chamber walls adjacent the intersections.

Considering the cylinders to be numbered in the same order as those discussed above, distribution chamber 140 provides fuel-air charges for cylinders 2, 4 and 6 and distribution chamber 142 provides fuel-air charges for cylinders 1, 3 and 5. Chambers 140 and 142 are positioned above and slightly outward of the respective intake ports which they serve. Short supply passages extend from the distribution chambers and communicate with the intake ports formed in the engine block or head for the respective cylinders served. As in the first modification, the intake ports for cylinders 1 and 3 and cylinders 2 and 4 are siamesed so that single openings in these positions of the manifold mating with the engine block are provided adjacent these sets of ports to deliver fuel-air charges to both ports in each set. Short passage 144 extends from the forward end of distribution chamber 140 inwardly and downwardly to conduct fuel air charges to the intake ports for cylinders 2 and 4. Short passage 146 similarly serves cylinders 1 and 3. Short passage 148 is located at the rear end of distribution chamber 140 and extends inwardly and downwardly to communicate with the inlet port for engine cylinder 6. Short passage 150 similarly serves engine cylinder 5. This passage is shown in section in FIGURE 10.

A transverse distribution chamber or passage 152 extends across the rear end of the manifold so that its end 154 communicates with the intake port for engine cylinder 8 and its other end 156 communicates with the intake port for engine cylinder 7. Passage 138 is connected with distribution chamber 152 in a generally central section of that passage to conduct fuel-air charges for cylinders 7 and 8 from plenum chamber 126. This intersection is also preferably provided with sharp corners, and that portion of chamber 152 forming the intersection is preferably normal to passage 138.

An exhaust crossover passage system is provided underneath substantially the entire length of transverse distribution passages 134 and 136 as well as the forward ends of feed passages 137 and 139, which form the inlet end of passage 138, and portions of plenum chamber 126. This system includes passages 158 and 159 which are respectively adjacent passages 134 and 136 and may have common walls with these passages. Passages 158 and 159 may be relatively wide at those ends adjacent the exhaust heat interchange section 135, to which they are connected. The outer end 160 of passage 158 is positioned to communicate with the exhaust outlet port 161 of one of the cylinders of the engine bank 122 and the end 162 of passage 159 is positioned to communicate with the exhaust outlet port 163 of one of the cylinders of engine bank 124.

Exhaust heat interchange section 135 has a baffle wall 164 directly opposite plenum chamber inlet 128 and providing one wall of the plenum chamber. Two side wall baffles 165 and 166 are attached to wall 164 and extend into plenum chamber 126 for a short distance. These baffles are secured to and positioned at right angles to wall 164 and preferably extend the full height of the plenum chamber. The distance between these baffles is approximately equal to the diameter of the plenum inlet 128. As the fuel air mixture enters plenum chamber 126 from the carburetor it engages wall 164, which acts as a ram wall and is directed to legs 134 and 136 and feed passages 137 and 139 past baffles 165 and 166 so that legs 134, 136 and 138 receive their proportionate shares of mixture. The manifold thus obtains optimum effects of mixture distribution between the cylinders and is not sensitive to the direction of fuel-air mixture flow.

The exhaust heat interchange section 135 has a separating wall 167 dividing the interior of the section into two vertically extending passages 169 and 171 which are connected at their upper ends by omitting the upper portion of separating wall 167. This allows exhaust gases to flow between the two cylinder heads 122 and 124 and heat the ram surface 164 and the inner side walls of feed passages 137 and 139. Adequate heating of surface 164 is required to properly vaporize the fuel for equal mixture distribution to each of the cylinders. Hot gases from the exhaust crossover passage of engine bank 122 will enter passage 158, heating the lower surface of distribution passage 134, and then enter passage 169 of section 135. The gases will rise above the separating wall 167 and cross over into passage 171. They then flow through passage 159 and heat the lower surface of distribution passage 136.

The portions of the manifold which engage the engine blocks or heads 122 and 124 through head gaskets have appropriate openings aligned with the short passages so as to mate with the cylinder inlet ports. Thus opening 168 will connect short passage 146 with the inlet ports of cylinders 1 and 3. Opening 170 connects short passage 150 with the inlet port of engine cylinder 5, and opening 172 connects the end 156 of distribution passage 152 with the intake port for engine cylinder 7.

Suitable bosses 174 are provided with bolt receiving apertures so that the manifold may be secured to engine blocks 122 and 124 by suitable mounting means such as bolts 178. The outer ends of the manifold may also be formed as to receive suitable securing bolts or other securing means for firmly attaching the manifold ends to the respective banks.

The manifold will function in a manner similar to the first modification so that the same timing of the fuel-air charges to the respective engine cylinders is obtained.

What is claimed is:

1. An induction system for an internal combustion engine having parallel banks of cylinders, said system comprising an induction manifold adapted to be mounted between said banks of cylinders for delivering fuel-air charges to the intake ports for said cylinders and a side-draft carburetor mounted on said manifold so as to be nested between said engine cylinder banks, said manifold having an intake plenum chamber for receiving a fuel-air mixture from said carburetor, first and second transversely disposed distribution passages communicating with said intake plenum chamber, a third longitudinally disposed distribution passage communicating with said intake plenum chamber, first and second distribution chambers respectively connected to and communicating with said first and second distribution passages and extending longitudinally of said manifold, a transverse distribution chamber connected to and communicating with said third distribution passage and extending across substantially the entire width of said manifold, and passage means for communicating said distribution chambers with the intake ports for the cylinders of said engine.

2. The system of claim 1, said transverse distribution chamber and passage means connected therewith being arranged to provide fuel-air charges to one cylinder on each of two adjacent ends of said banks of cylinders.

3. The system of claim 1, said first and second distribution chambers being arranged to provide fuel-air charges for a plurality of adjacent cylinders in each of said engine banks of cylinders.

4. The system of claim 1, said first and second distribution chambers being arranged to provide fuel-air charges for a plurality of adjacent cylinders in each of said engine banks of cylinders in one pair of adjacent ends of said banks of engine cylinders, and said transverse distribution chamber being arranged to provide fuel-air charges to one cylinder in each bank of the other pair of adjacent ends of said banks of cylinders.

5. The system of claim 1, said first, second and third distribution chambers each providing successive fuel-air charges for the engine cylinders respectively served thereby at least 180° of engine crank angle apart.

6. The system of claim 1, said first, second and third distribution chambers respectively providing fuel-air charges to a plurality of said engine cylinders firing 180° apart and to other of said engine cylinders firing at least 270° apart.

7. The system of claim 1, said first distribution chamber being arranged to provide fuel-air charges for a series of said engine cylinders in order wherein each of the cylinders in said series fire at least 180° apart and said second distribution chamber providing fuel-air charges in the same order as said first distribution chamber to provide a balanced fuel-air mixture distribution in said first and second distribution chambers.

8. The system of claim 1, said intake plenum chamber having a baffle secured therein and extending between the top and bottom walls thereof and positioned in front of said third distribution passage and extending transversely for substantially the entire width of said third distribution passage for directing fuel-air mixture flow in an equal cylinder-to-cylinder distribution to said first, second and third distribution passages.

9. For use with a V-type internal combustion engine, an induction system having a fuel-air induction manifold for supplying fuel-air charges to the cylinders of said engine, said manifold comprising, a centrally disposed intake plenum chamber and first, second and third induction passageways and first, second and third distribution chambers respectively connected with said intake plenum chamber by said passageways, passage means for connecting said first, second and third distribution chambers to the intake ports of the engine cylinders and an exhaust crossover passage in heat-conducting relation with said intake plenum chamber and two of said passageways throughout the length of said two passageways.

10. The induction system of claim 9, said exhaust crossover passage extending underneath said two passageways and said intake plenum chamber and having a common wall therewith.

11. The induction system of claim 9, said intake plenum chamber and said first, second and third distribution chambers and said first, second and third induction passageways and said passage means having a common plane passing therethrough above said exhaust crossover passage.

12. For use with a V-type internal combustion engine having parallel banks of cylinders extending longitudinally of said engine, a fuel-air intake manifold and engine hot water distribution structure, said structure comprising a pair of parallel distribution chambers on opposite sides of said manifold and adapted to extend longitudinally of said engine banks of cylinders, a transverse distribution chamber at one end of said manifold and adapted to extend between said banks of cylinders, first and second transversely extending intake passageways and an intake plenum chamber between said pair of distribution chambers, each of said parallel distribution chambers being respectively connected with said intake plenum chamber and said first and second intake passageways, a third intake passageway extending centrally and longitudinally of said manifold and connecting said intake plenum chamber with said third distribution chamber, and a transversely extending hot water outlet manifold passage adapted to receive hot water from both of said engine banks of cylinders and having water outlet means for conducting hot water out of said banks of cylinders and said hot water transverse passage.

13. The structure of claim 12, said intake plenum chamber and all of said distribution chambers and intake passageways and said hot water outlet passage having a common plane passing therethrough.

14. In an intake manifold for a V-type internal combustion engine having a pair of longitudinally arranged parallel banks of cylinders, said manifold comprising an intake plenum chamber for receiving a fuel-air mixture from a carburetor and first and second intake passageways extending transversely of said manifold and a third intake passageway extending longitudinally of said manifold, said first, second and third passageways being connected to said intake plenum chamber for receiving fuel-air mixture therefrom, first, second and third distribution chambers adapted to distribute charges of fuel-air mixture to the cylinders of said engine and connected with said first, second and third intake passageways respectively to receive fuel mixture therefrom, said intake plenum chamber and said first, second and third intake passageways and said first, second and third distribution chambers having a common plane passing therethrough throughout substantially the entire length thereof.

15. An induction manifold for an internal combustion engine having parallel banks of cylinders, said manifold being adapted to be mounted between said banks of cylinders for delivering fuel-air charges to the intake ports of said cylinders and comprising, an intake plenum chamber adapted to receive a fuel-air mixture from a carburetor, first and second transversely disposed distribution passages communicating with said intake plenum chamber, a third longitudinally disposed distribution passage having a Y-shaped inlet forming a pair of feed passages and communicating with said intake plenum chamber, first and second distribution chambers respectively connected to and communicating with said first and second distribution passages and extending longitudinally of said manifold, a transverse distribution chamber connected to and communicating with said third distribution passage at the end thereof opposite said Y-shaped end and extending across substantially the entire width of said manifold, and passage means adapted to connect said distribution chambers with the intake ports for the cylinders of the engine.

16. The intake manifold of claim 15, said transverse distribution chamber and passage means connected therewith being arranged to provide fuel-air charges to one engine cylinder on each of two adjacent ends of the banks of cylinders.

17. The intake manifold of claim 15, said first and second distribution chambers being arranged to provide fuel-air charges for a plurality of adjacent cylinders in each of the engine banks of cylinders.

18. The induction manifold of claim 15, said first and second distribution chambers being arranged to provide fuel-air charges for a plurality of adjacent cylinders in each of said engine banks of cylinders in one pair of adjacent ends of the engine cylinder banks, and said transverse distribution chamber being arranged to provide fuel-air charges to one cylinder in each bank of the other pair of adjacent ends of the banks of cylinders.

19. The induction manifold of claim 15, said first, second and third distribution chambers respectively being adapted to provide fuel-air charges to a plurality of engine cylinders firing 180° apart and to other engine cylinders firing at least 270° apart.

20. The manifold of claim 15, said manifold further having an exhaust crossover and heat interchange system in heat conducting relation with said intake plenum chamber and said first and second distribution passages throughout the length of said first and second distribution passages.

21. A fuel-air induction manifold adapted to supply fuel-air charges from a carburetor to the cylinders of a V-type internal combustion engine and comprising a centrally disposed intake plenum chamber and first, second and third induction passageways and first, second and third distribution chambers respectively connected with said intake plenum chamber by said passageways, passage means adapted to connect said first, second and third distribution chambers to the intake ports of the engine cylinders, exhaust crossover passage means extending underneath said first and second induction passageways and portions of said intake plenum chamber and said third induction passageway and a hollow formation extending vertically through said intake plenum chamber and the inlet end of said third induction passageway, the interior of said hollow wall formation being adapted to receive hot exhaust gases therethrough from said exhaust crossover passage means.

22. The intake manifold of claim 21, said intake plenum chamber having an inlet adapted to receive fuel-air charges from the carburetor, one wall of said hollow wall formation being spaced from said inlet and substantially normal thereto to provide a ram wall, and a pair of vertically extending baffles secured to said one wall and spaced apart transversely of said manifold a distance substantially equal to the width of said plenum chamber inlet.

No references cited.